United States Patent Office.

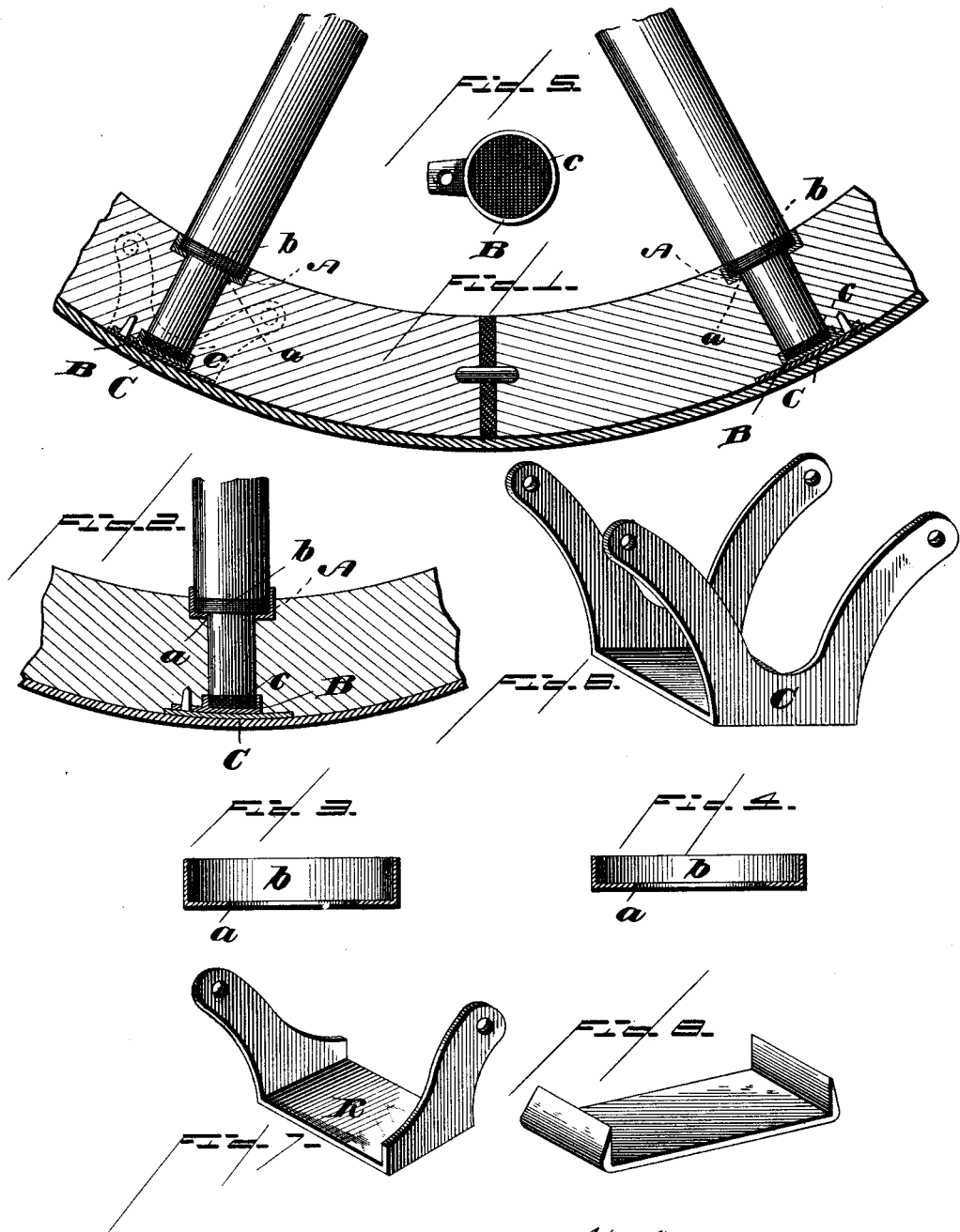

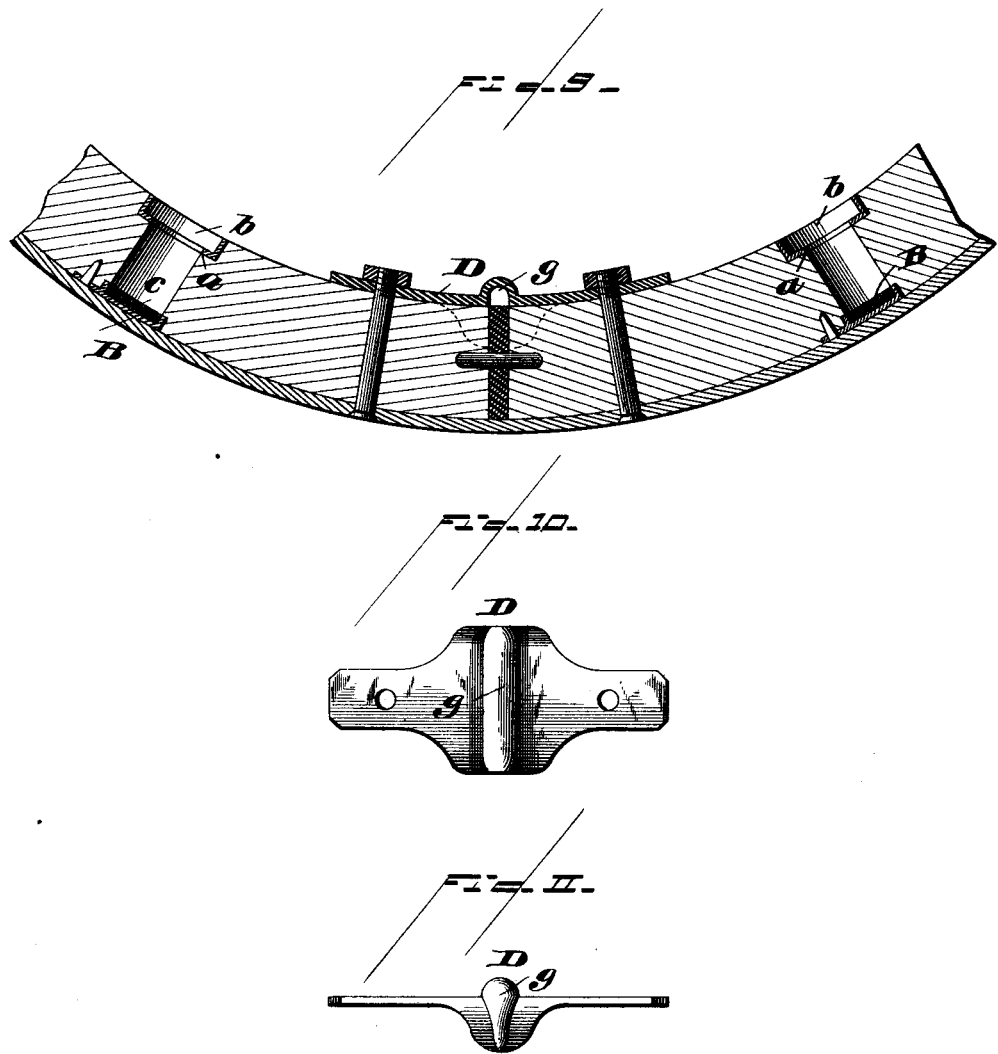

A. McINTOSH WILLIAMSON, OF PHILADELPHIA, PENNSYLVANIA.

WHEEL.

SPECIFICATION forming part of Letters Patent No. 387,549, dated August 7, 1888.

Application filed October 22, 1887. Serial No. 253,076. (No model.)

*To all whom it may concern:*

Be it known that I, A. McINTOSH WILLIAMSON, a citizen of the United States, residing at Philadelphia, in the county of Philadelphia and State of Pennsylvania, have invented certain new and useful Improvements in Carriage-Wheels; and I do declare the following to be a full, clear, and exact description of the invention, such as will enable others skilled in the art to which it appertains to make and use the same.

Figure 1 is a longitudinal sectional view through the rim of a wheel, showing my improvements in connection therewith. Fig. 2 is a similar view in detail, showing a modified form of socket. Figs. 3 and 4 are detail views of different forms of sockets. Fig. 5 is a plan view of the cup or socket that is designed to receive the lower end of the spoke-tenon. Figs. 6, 7, and 8 are detail views of different forms of clasping-plates. Fig. 9 is a sectional view through the rim of a wheel, showing the corrugated clasping-plate secured thereto. Figs. 10 and 11 are detail views of the clasping-plate.

My invention relates to wheels for vehicles; and it consists in the novel construction of parts, as hereinafter specified, and claimed.

In Letters Patent No. 233,311, granted to me October 12, 1880, I have set forth and claimed elastic pads interposed between the spokes and the fellies, between the ends of the spoke-tenons and the tire, and between the meeting ends of the fellies.

The present invention consists in improvements on the construction so patented, and is especially designed for use therewith; but it is not my intention to limit its use to that purpose only.

The letter A of the drawings represents an annular metallic socket for the spoke of a wheel. This socket is constructed with a shoulder (marked $a$) which is adapted to receive an elastic cushion, preferably of rubber, interposed between the shoulder of the spoke and the said shoulder $a$, in the manner represented in Fig. 1 of the drawings. The elastic cushion above mentioned is marked $b$ on the drawings. This socket is countersunk in the felly, as shown in Fig. 1.

B indicates a metal socket, preferably closed at its lower end, and is designed to hold an elastic cushion, $c$, which is interposed between the end of the spoke and the base of said last-mentioned socket. It is well known that changes in weather from heat to cold act with great force upon the tire and wood of a vehicle-wheel.

By the expansion of the tire and felly in extremely hot weather the rubber will be enlarged. Wet and dry weather also affect the felly in a similar manner. This may be called the "ebb and flow" of the rubber. In my Patent No. 233,311 rubber was interposed between the meeting ends of the fellies, but no provision was made for the overflow of the rubber. In order to accomplish this end I have invented a corrugated clasping-plate, D, which is bolted or otherwise secured to the felly, as shown on Fig. 9 of the drawings, and clasps the felly, as shown on each side, at the meeting ends or joints of the fellies. In the center of this plate I form a recess or corrugation, $g$. This recess serves to hold a large portion of the overflow of the cushion when the iron or wood of the wheel-rim press upon its sides. This plate D is substituted for the ordinary joint-plate employed on vehicle-wheels. It will be observed that the socket B is countersunk in the felly in the same manner as the socket A, but upon the opposite side thereof.

Between the socket B and the tire I interpose a clasping-plate, (marked C,) which is preferably constructed with bifurcated arms, as shown on Fig. 3, or oblique arms, (represented on Fig. 4,) or it may be formed without such arms, as shown on Fig. 7. When arms are employed on the clasp or plate, they are perforated, so that the plate may be secured to the felly by screws or rivets. This plate C clasps the felly on each side and serves to hold the parts in place with great firmness. For light carriages a simple perforated plate with one holding-arm is sufficient. Such plate is represented on Fig. 7 by the letter K.

It is obvious that by my construction of the wheel and arrangement of the elastic pads and holding-plates the wear and strain upon a carriage are lessened, for the reason that a great part of the jarring and vibration incident to travel over rough roads or pavements and waterbreaks are reduced. It is furthermore obvious that wheels of this construction will in great measure neutralize the drumming and rumbling noises that are so common with close carriages.

Having described this invention, what I claim is—

1. The combination, with the elastic cushion and the fellies of a vehicle-wheel, of the corrugated plate, substantially as specified.

2. The combination, with the spokes and fellies of a vehicle-wheel and the cushions C, of the clamping-plate interposed between the felly and tire, substantially as specified.

In testimony whereof I affix my signature in presence of two witnesses.

A. McINTOSH WILLIAMSON.

Witnesses:
C. W. DESHIELL,
T. ED. TURPIN.